June 5, 1928.
J. T. TURNER
MACHINE FOR BAKING PASTRY
Filed June 4, 1926   4 Sheets-Sheet 1
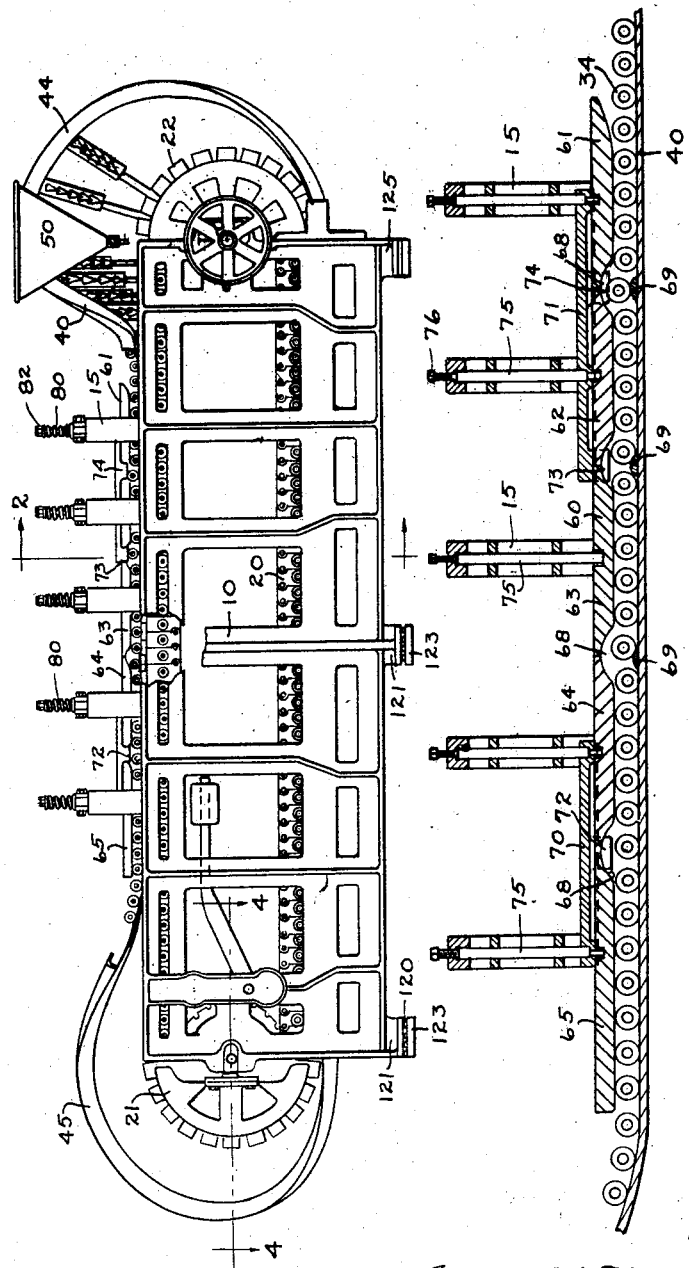
Inventor
James T. Turner
By Bates, Macklin, Golrick & Hearn
Attorneys

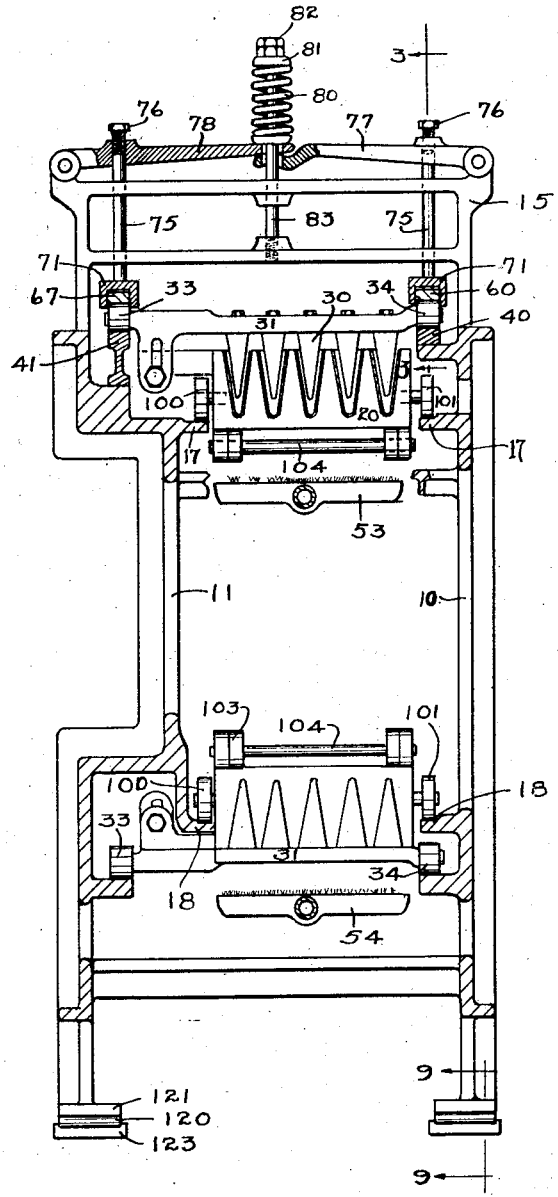

June 5, 1928.

J. T. TURNER 1,672,551

MACHINE FOR BAKING PASTRY

Filed June 4, 1926 — 4 Sheets-Sheet 3

Inventor
James T. Turner,
By Bates Macklin Gobrick & Pear
Attorneys

June 5, 1928.
J. T. TURNER
1,672,551
MACHINE FOR BAKING PASTRY
Filed June 4, 1926    4 Sheets-Sheet 4
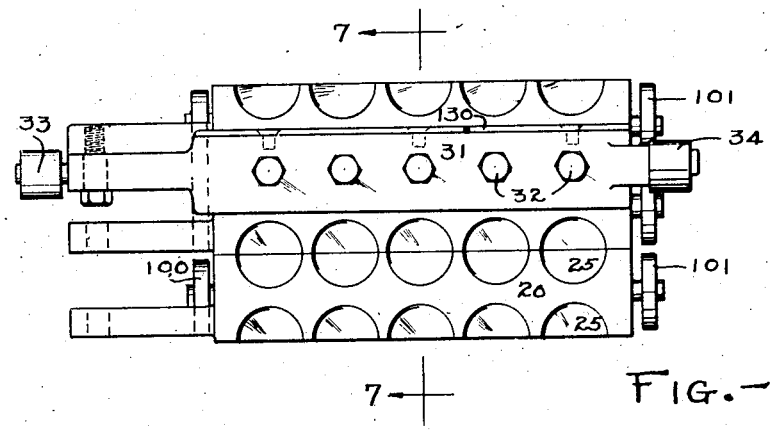
FIG.—6
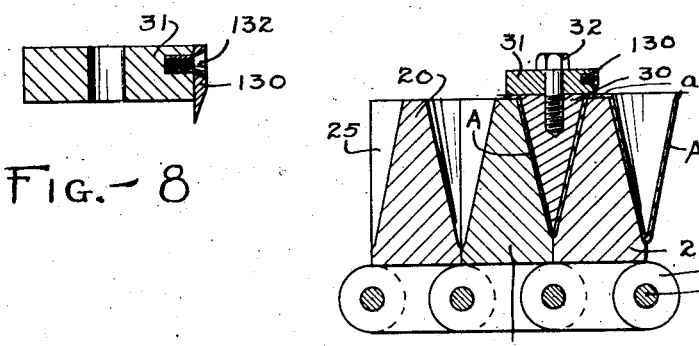
FIG.—8
FIG.—7
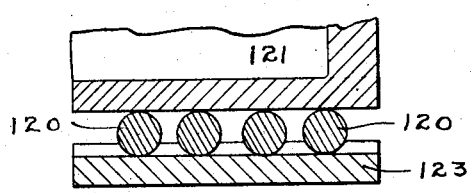
FIG.—9
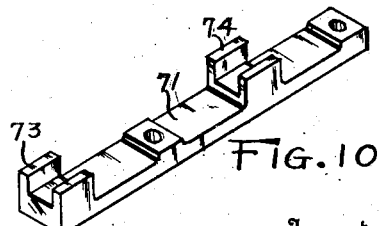
FIG. 10
Inventor
James T. Turner,
By Baker, Mackin, Golrick & Hean
Attorneys Patented June 5, 1928.

1,672,551

UNITED STATES PATENT OFFICE.

JAMES T. TURNER, OF ATLANTA, GEORGIA.

MACHINE FOR BAKING PASTRY.

Application filed June 4, 1926. Serial No. 113,594.

This invention relates to a machine for making ice cream cones and particularly a machine of the general type shown in my prior Patents Nos. 1,393,587 and 1,573,588 wherein there are a series of cooperating moulds in an endless conveyor which is caused to be moved continuously beneath a source of supply for the batter and through a suitable heated region to a discharge point, after which the moulds return for reloading. The machine provides female moulds separable through a row of cavities and hinged together successively to make an endless conveyor, while the male moulds are pivotally mounted on the successive links and comprise bars which may carry cones to coact with the correspondingly shaped cavities of the female moulds.

One of the objects of the present invention is to provide a simple and readily adjustable breather arrangement for the moulds, by which I mean mechanism to allow the periodic separation of the male and female moulds sufficiently for the escape of steam from the heated batter.

Another object of the invention is to provide means for automatically maintaining the female mould blocks in close contact with each other while they are traveling along the baking course so that perfect cavities will result and there will be no possibility of fins of batter passing between the female blocks, and the machine may operate comparatively quietly. The mechanism provided for this compacting of the moulds is arranged to allow suitable expansion and contraction of the machine as its heat varies in operation or in starting or stopping the baking.

Another feature of the invention is the provision of a simple means for cutting through the flange of batter between the successive sets of moulds, so that as the mould members separate in swinging around the course, following the baking, there will be no tendency to tear the formed cones.

My invention is hereinafter more fully described in connection with a detailed description of the drawings, which illustrate a preferred embodiment of the invention. The essential novel characteristics are summarized in the claims.

Figure 4:
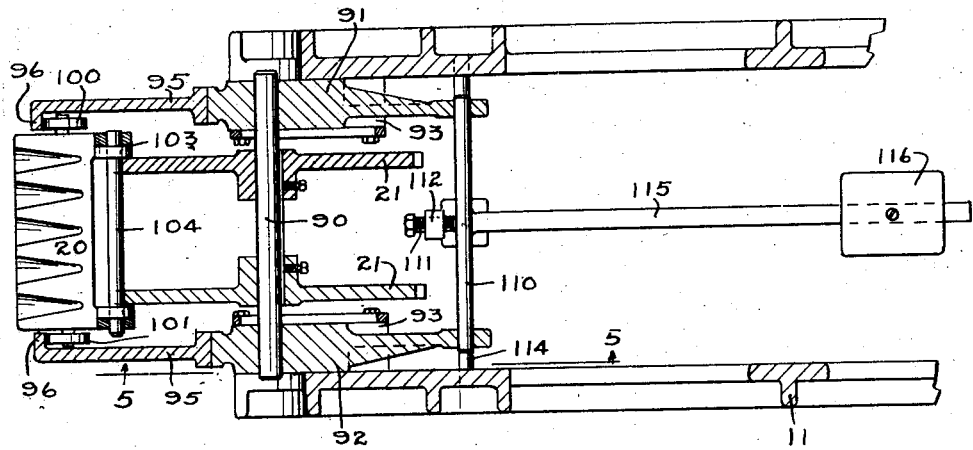
Figure 5:
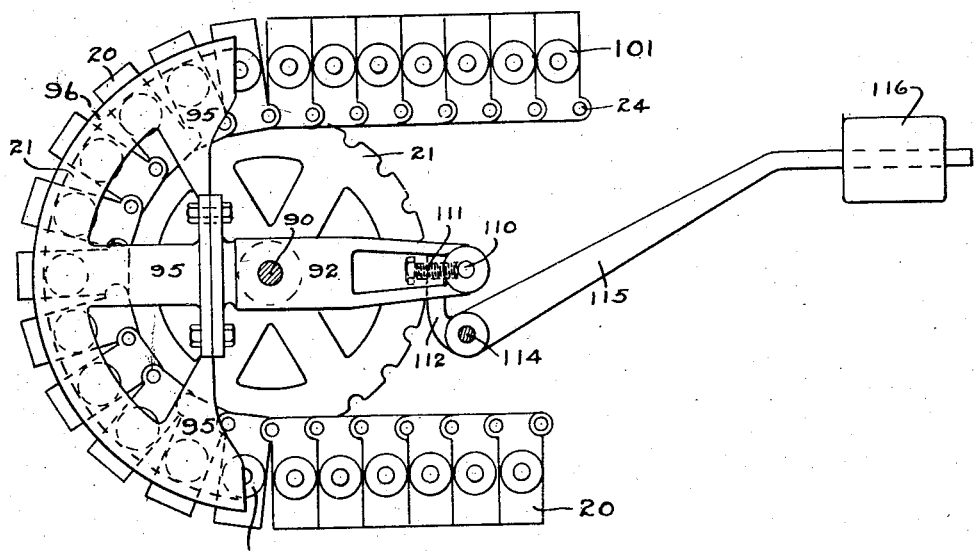

In the drawings, Fig. 1 is a side elevation of the machine with portions omitted for simplicity; Fig. 2 is a vertical transverse section on a larger scale as indicated by the line 2—2 on Fig. 1; Fig. 3 is a longitudinal vertical section through the guiding members for the male mould member, as indicated by the line 3—3 on Fig. 2; Fig. 4 is a horizontal section substantially on the line 4—4 on Fig. 1, showing the automatic take up mechanism for the chain of moulds; Fig. 5 is a side elevation of the take up mechanism in a plane indicated by the line 5—5 in Fig. 4; Fig. 6 is a plan of a few of the female moulds and one male mould; Fig. 7 is a cross section of the mould shown in Fig. 6 in plan of the section being indicated by the line 7—7 on Fig. 6; Fig. 8 is an enlarged cross-sectional view of the bar carrying the cones of the male mould; Fig. 9 is a vertical section illustrating the roller support for the legs of the machine, shown on a smaller scale on Fig. 1, this view being a vertical section on the line 9—9 of Fig. 2; Fig. 10 is a bottom perspective of one of the equalizer bars shown in section in Fig. 3.

I will first briefly describe the general characteristics of the machine shown. Reference may be made to my prior patents mentioned for a fuller description. I will then take up the features constituting the present invention.

The frame of the machine comprises essentially upright front and rear wall members 10 and 11 which are suitably cross connected. Between the walls of this frame is carried the endless chain of female moulds 20 mounted on suitable wheels 21 and 22 at opposite ends of the frame. The chain comprises a series of mould blocks each hinged to the next block at the pivot points 24, each block having at its opposite edges semiconical cavities 25, the partial cavities of one block coacting with those of the adjacent block to form complete conical cavities as shown in Fig. 6. The male moulds comprise a series of conical projections 30, mounted on a bar 31 as by cap screws 32. The bars 31 are loosely pivoted to extensions of the female moulds.

The male mould bars 31 are provided with rollers 33 and 34 which coact with suitable tracks 40 and 41 to control the presentation of the moulds. That is to say, at the right hand end of the machine as shown in Fig. 1, the tracks 40 tip up into the extended course shown at 44 which operates to swing back the male moulds to uncover the females. Thereafter the track turns down into a horizontal course to hold the male moulds in position in the females. The chain of moulds in the upper reach travels toward the left, and at the left hand end of the machine the track again operates as shown at 45 to open the moulds to discharge the cones, after which the track returns the male moulds into closed position and the chain travels in this condition along its lower reach until it is again opened.

The batter is inserted in the female cones when the males are tipped back by the track 44. In Fig. 1, I have indicated at 50 a suitable batter receptacle for so loading the moulds. Between the frame walls are suitable gas burners or other heaters illustrated at 53 and 54 which heat the moulds, the burner 54 giving a preliminary heating and the burner 53 effecting the baking of the batter in the moulds. The whole machine is enclosed in suitable heat retaining walls not shown.

It will be seen from the above brief description that the machine is continuously operated, receiving batter in the open moulds as they pass beneath the discharge spouts of the batter receptacle, thereafter baking such batter to produce cones and finally discharging the same at the left hand end of the machine. The batter when inserted is comparatively liquid and with a result that the baking action produces considerable steam. One of the features of the invention is to provide an effective means for causing the discharge of steam as the moulds progress. Mechanism for accomplishing this is best shown in Figs. 1, 2 and 3, and will now be described.

Directly over each of the tracks 40 and 41, on which the rollers 34 and 33 ride, is a row of aligned bars 60 and 67 pressed down on the rollers. The front row 60 is shown in detail in Fig. 3 and comprises separate aligned bars 61, 62, 63, 64 and 65. These bars are pressed downwardly by springs as presently described. At suitable intervals, preferably where adjacent bars abut, are recesses in the bars directly over the rollers as indicated at 68. Wherever these recesses occur, the rollers beneath them are free to rise. In some instances I form on top of the trackways suitable humps, as indicated at 69 Fig. 3 compelling the rollers to rise and thus raise the male moulds. The result of this action is a periodic freeing of the moulds to allow the steam to escape.

To allow the rows of aligned bars 60 and 67 to float freely on the rollers and be subject to spring pressure upon them, I mount, over each of these rows, two other bars 70 and 71, each of which has down-turned lips engaging the opposite sides of the presser bars. The bar 70 is shown as having lips 72 in its central region for this purpose, while the bar 70 has lips 73 adjacent one end and lips 74 in an intermediate location, as shown more particularly in Fig. 10. Rising from each of the bars 70 and 71, are upright rods 75 guided in frame standards 15 and at their upper ends abutting set screws 76 in arms 77 and 78. The rear end of the arm 77 is shown as extending beneath the forward end of the arm 78 and both arms are pressed downwardly by a helical compression spring 80 which bears at its upper end against a washer 81 adjustable by nuts 82 on a stationary rod 83. By adjusting the nuts 82 and by adjusting individual set screws 76, the pressure on the two sets of bars 60 and 67 may be regulated as desired.

The mechanism described enables the moulds to be maintained closed with any definite steam pressure within them, an excess of steam pressure however causes the lifting of the corresponding presser bar over the mould roller, allowing the escape of steam. Experience has demonstrated that it is desirable to positively open the moulds periodically as they progress, to insure escape of steam, and it is for this purpose that the humps 69 are provided. They operate to raise the rollers positively as the moulds travel beyond these humps, thus opening the moulds or allowing them "to breathe", as I call it. The recess 68 above the hump 69 allows this rising of the roll and provides sufficient clearance so that the roll may rise still higher if the steam conditions within the mould required it. The moisture will be largely driven off and the batter cooked when a mould reaches the last recess 68 shown in Fig. 3 and accordingly in this instance I do not provide any hump beneath the recess to positively open the mould, but simply permit it to open freely should internal steam effect such opening.

It will be seen that the breathing system described causes the periodic discharge of the steam so that the batter may be quickly baked to a dry condition, while the adjustment enables the retention of the desired pressure within the moulds for the most part while the cooking is progressing. Finally, the device provides a safety relief, preventing damage to any of the parts from excessive steam pressure.

The heat in the machine causes in the aggregate material expansion to the chain of moulds, which expansion is of course greatest when the heat is started but varies from time to time as the heat is adjusted for different batter conditions. To provide for this situation, and at the same time maintain the female blocks constituting the chain always close together during the loading and baking operations, so that batter is not lost and perfect results are produced, I provide an expansion adjustment and take up illustrated in Figs. 1, 4, 5 and 9 as follows:

The wheels 21 are mounted on a shaft 90 which is journalled in a pair of blocks 91 and 92 which are slidable in housings 93 carried by the frame walls of the machine. These blocks carry arms 95 which support segmental inwardly projecting flanges 96 which overhang rollers 100 and 101 on the female mould blocks 20, these blocks being hinged together at the inner or under edges by means of ears 103 on the blocks and a hinge pin 104. On the straight courses of the chain's travel these rollers ride on frame ledges 17 and 18 (Fig. 2) and support the moulds. At the left hand end of the machine, however, the rollers bear outwardly against the arcuate flanges 96.

The two bearing blocks 91 and 92 are connected by a cross rod 110 against which bears a set screw 111 mounted in the upwardly projecting arm 112 of a bell crank mounted on a stationary cross rod 114 and having a long arm 115 adjustably carrying a heavy weight 116. This weight tends to pull the blocks 91 and 92 toward the right, and the arcuate flanges 96 thus draw the sprocket wheels 21 and the female moulds about the same toward the right to compact the moulds in the horizontal reaches of the chain. On the other hand, the heat causes expansion of the chain which draws these sprocket wheels toward the left, raising the weight 116.

It will be seen that the mechanism described, while operating to maintain the chain in constantly compacted form allows expansion as necessary. The expansion of the frame itself is provided for by means of rollers 120 (Figs. 1 and 9) between frame legs 121 and suitable base plates 123, the legs at the right hand end of the machine 125 being ordinarily anchored tightly to the floor on which the machine rests.

As the batter is discharged onto the chain of moulds while they are moving it will necessarily be deposited to some extent on top of the mould members between the cavities. Such batter when cooked would connect one set of cones with the next; as the sets of cones are separated apart as the chain of moulds travels around the left hand loop such spreading would be liable to tear the one set of cones from the next in an irregular line which might damage the produced cones. To obviate this difficulty, I provide on one side of each bar 31 which carries the male cones, a knife blade 130 which coacts with the intermediate top surface of the female moulds to cut through the batter, so that each set of cones after cooking, is disconnected from the adjacent set. Such cones are shown at A in Fig. 7, the flange of batter at the top thereof at a. It will be seen from this view that the knife projects through such batter against the top of the mould block and thus prevents any set of baked cones from troublesome adhering to the adjacent set. Accordingly, as the moulds separate in passing around the loop at the left hand end of the machine, the sets of baked cones are successively discharged freely from the following cones. The knife 130 is preferably removably held by screws 132 on the side of the block 31 so that it may be removed and sharpened whenever desired.

It will be seen that my machine, which is a refinement of those shown in my prior patents referred to, provides for taking care of the otherwise troublesome heat conditions both within the cavities and within the machine generally and provides for producing disconnected sets of baked cones notwithstanding the continuous feeding of the batter.

Having thus described my invention, I claim:—

1. The combination with a traveling set of female separable moulds pivoted to each other to form a chain, a coacting set of male moulds, said male moulds having rollers, trackways on which the rollers bear, bars bearing on the rollers, and springs acting on the bars to hold the rollers on the trackway yieldingly.

2. The combination with a traveling set of female moulds, a coacting set of male moulds, said male moulds having rollers, trackways on which the rollers bear, spring means acting to hold the rollers on the trackway yieldingly, the trackway being provided with a hump to engage the rollers and separate the moulds.

3. The combination with a traveling set of female moulds, a coacting set of male moulds, said male moulds having rollers, trackways on which the rollers bear, means resiliently bearing on the rollers to hold them on the trackways, said means being provided with recesses to allow the movement of the rollers to partially separate the moulds, and the trackway having humps registering with such recesses to positively cause such separation.

4. In a machine of the character described, the combination of an endless chain of female moulds, male moulds coacting therewith, rollers carried by the male moulds, trackways on which said rollers travel, presser bars resiliently forcing the rollers against the trackways, said trackways having periodically arranged humps to lift the male moulds and the presser bars having periodically arranged recesses to allow such movement.

5. The combination of a set of female moulds, a set of male moulds, rollers on the male moulds, trackways for the rollers, aligned bars bearing on the rollers and pressing them against the trackways, other bars over said aligned bars having lips engaging the sides of the aligned bars, and springs pressing said other bars toward the trackways.

6. The combination of a traveling set of female moulds, a traveling set of male moulds equipped with rollers, trackways for said rollers, presser bars for pressing the rollers against the trackways, positioning bars overlying the presser bars and having lips engaging their sides, arms adjustably connected with the positioning bars, and a spring acting on said arms.

7. The combination of a set of female moulds, a set of male moulds, rollers on the opposite ends of the male moulds, trackways for the rollers, aligned bars bearing on the rollers and pressing them against the trackways, other bars over said aligned bars having lips engaging the sides of the aligned bars, suitably guided rods pressing said other bars toward the trackways, pivoted arms adjustably acting on the rods, and spring means acting on said arms.

8. In a machine of the character described, the combination of an endless chain of moulds, a wheel about which the same travels, a sliding support for the wheel, mechanism tending to move the support to compact the chain but allowing its expansion, and means for heating the chain.

9. In a machine of the character described, the combination of an endless chain of female moulds, male moulds pivotally carried thereby, a rotatable wheel about which said chain travels, a sliding support for the wheel axle, and mechanism engaging the chain of moulds about the wheel and tending to move them and the support to compact the chain.

10. The combination of an endless chain of moulds, sprocket wheels over which the same pass, a shaft for the sprocket wheels slidably mounted, blocks carrying the shaft, a weight tending to shift the blocks in opposition to the movement caused by heat expansion of the chain.

11. The combination of an endless chain of mould members hinged together, a pair of sprocket wheels about which such chain passes in a loop, a shaft on which the sprocket wheels are mounted, a pair of bearing members for the shaft, said bearing members being slidably mounted, means acting on the bearing members and tending to move them in a direction away from the loop of the chain, a pair of members carried by the bearing members and having inwardly extending arcuate flanges overlying portions carried by the moulds, whereby said means tends to compact the chain.

12. In a machine of the character described, the combination of an endless chain of mould blocks hinged together, said blocks having rollers on their ends, a wheel about which the same loops, slidable bearings for the wheel, guards carried by the bearings and having arcuate flanges extending onto the outer sides of the rollers on said loop, and means for moving the bearings.

13. In a machine of the character described, the combination of an endless chain of female mould blocks hinged together, male moulds carried by said chain, said blocks having rollers on their ends, a wheel about which the same loops, slidable bearings for the wheel, a weight and lever tending to pull the wheel away from the loop and guards carried by the bearings and having arcuate flanges extending onto the outer sides of the rollers on said loop, whereby such movement of the weight compacts the chain.

14. The combination of an endless chain of mould members hinged together, a pair of sprocket wheels about which such chain passes in a loop, a shaft on which the sprocket wheels are mounted, a pair of bearing members for the shaft, said bearing members being slidably mounted, a weight and leverage acting on the bearing members and tending to move them in a direction away from the loop of the chain, a pair of members carried by the bearing members and having inwardly extending arcuate flanges overlying rollers carried by the moulds, whereby the weight tends to compact the chain, and heating means tending to expand the chain in opposition to the weight.

15. The combination with a frame, of an endless chain of moulds carried thereby, a wheel about which the moulds pass in a loop, bearings carrying such wheel and slidably mounted on the frame, means for heating the chain and means tending to shift the bearings according to the expansion or contraction of the frame, that portion of the frame adjacent the said wheel being mounted on rollers.

16. In a machine of the character described, the combination of articulated female moulds equipped with groups of coacting partial cavities adapted to coact to make complete cavities, male moulds cooperating with the female moulds, means for holding the male moulds in position, and blades carried by the male moulds and adapted to coact with portions of the female moulds intermediate of different groups of cavities to separate the batter in such region.

17. The combination of female moulds hinged together and having conical cavities when abutting, a set of coacting male moulds each having a bar extending over a row of cavities provided by adjacent female moulds and having male cones carried by such bar, and a blade secured to the edge of the bar and adapted to coact with the face of the female mould block.

18. The combination of a set of female moulds hinged together, a set of coacting male moulds each having a bar extending over a row of cavities provided by adjacent female moulds and having male moulding members carried by such bar, a straight blade carried by the bar and adapted to coact with the face of the female mould block, a roller carried by said bar, and a guide for said roller adapted to move the male mould out of coaction with the female mould to enable loading of the latter, and thereafter to return the male moulds to position and the blade into coaction with the face of the female moulds alongside of a group of cavities.

19. The combination of a set of female moulds hinged together to form an endless chain, said moulds having on opposite sides semi-conical cavities, a set of coacting male moulds each having a bar hinged to the chain and extending over a row of cavities provided by adjacent female moulds and having male cones carried by such bar, a blade secured to the edge of each bar and adapted to coact with the face of a female mould block, rollers carried by said bar and guides for said rollers adapted to move the male mould into coaction with the cavities of female moulds and the blade into coaction with the face of the female moulds and hold the parts in this condition during heating, together with means for heating such moulds.

In testimony whereof, I hereunto affix my signature.

JAMES T. TURNER.